(12) United States Patent
Kang et al.

(10) Patent No.: US 11,195,014 B1
(45) Date of Patent: Dec. 7, 2021

(54) METHOD AND APPARATUS FOR ESTIMATING STATE OF WATERPROOF PAINT OF BUILDINGS USING SATELLITE IMAGERY

(71) Applicant: AJOU UNIVERSITY INDUSTRY-ACADEMIC COOPERATION FOUNDATION, Suwon-si (KR)

(72) Inventors: Ju Young Kang, Suwon-si (KR); Jae Hyeong Park, Busan (KR); Sang Ho Ahn, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/229,260

(22) Filed: Apr. 13, 2021

(30) Foreign Application Priority Data

Jan. 28, 2021 (KR) .................... 10-2021-0012693

(51) Int. Cl.
*G06K 9/00* (2006.01)
*G06F 16/58* (2019.01)
(Continued)

(52) U.S. Cl.
CPC ....... *G06K 9/00637* (2013.01); *G06F 16/587* (2019.01); *G06F 16/5866* (2019.01); *G06N 3/08* (2013.01)

(58) Field of Classification Search
None
See application file for complete search history.

(56) References Cited

U.S. PATENT DOCUMENTS

| 10,636,209 B1* | 4/2020 | Thaller ............... H04L 67/06 |
| 10,697,833 B2* | 6/2020 | Vignolo ............. G01N 21/276 |

(Continued)

FOREIGN PATENT DOCUMENTS

| CN | 111640125 A | 9/2020 | |
| GB | 2367826 A * | 4/2002 | ............... C09D 5/22 |
| KR | 10-2007761 B1 | 10/2019 | |

OTHER PUBLICATIONS

Um JS. Performance evaluation strategy for cool roof based on pixel dependent variable in multiple spatial regressions. Spatial Information Research. Apr. 2017;25(2):229-38. (Year: 2017).*

(Continued)

*Primary Examiner* — Michelle M Entezari
(74) *Attorney, Agent, or Firm* — Sughrue Mion, PLLC

(57) ABSTRACT

A waterproof paint state determining method of a building using a satellite imagery according to an exemplary embodiment of the present disclosure includes receiving search information including information about a location in which a waterproof paint application state of a rooftop of a building is to be measured from a user; searching a search satellite imagery which is at least one satellite imagery corresponding to the search information from a satellite imagery DB including a plurality of satellite imagery data; detecting a rooftop area which is a waterproof paint application area of at least one building corresponding to the search information from the search satellite imagery, using a convolutional neural network (CNN) technique; and calculating a state index which is an index indicating a waterproof paint application state of at least one building, based on reference color information and color information of the rooftop area.

8 Claims, 4 Drawing Sheets

(51) Int. Cl.
*G06F 16/587* (2019.01)
*G06N 3/08* (2006.01)

(56) References Cited

U.S. PATENT DOCUMENTS

2017/0249576 A1* 8/2017 Bipes .................. G06T 7/41
2018/0038681 A1* 2/2018 Van Mechelen ... G01N 21/3581
2020/0134753 A1* 4/2020 Vickers .............. G06K 9/00664

OTHER PUBLICATIONS

Samsudin SH, Shafri HZ, Hamedianfar A. Development of spectral indices for roofing material condition status detection using field spectroscopy and WorldView-3 data. Journal of Applied Remote Sensing. Jun. 2016;10(2):025021. (Year: 2016).*

Avudaiammal R, Elaveni P, Selvan S, Rajangam V. Extraction of buildings in urban area for surface area assessment from satellite imagery based on morphological building index using SVM classifier. Journal of the Indian Society of Remote Sensing. Sep. 2020; 48(9):1325-44. (Year: 2020).*

Communication dated May 26, 2021 from the Korean Intellectual Property Office in KR Application No. 10-2021-0012693.

* cited by examiner

[FIG. 1]
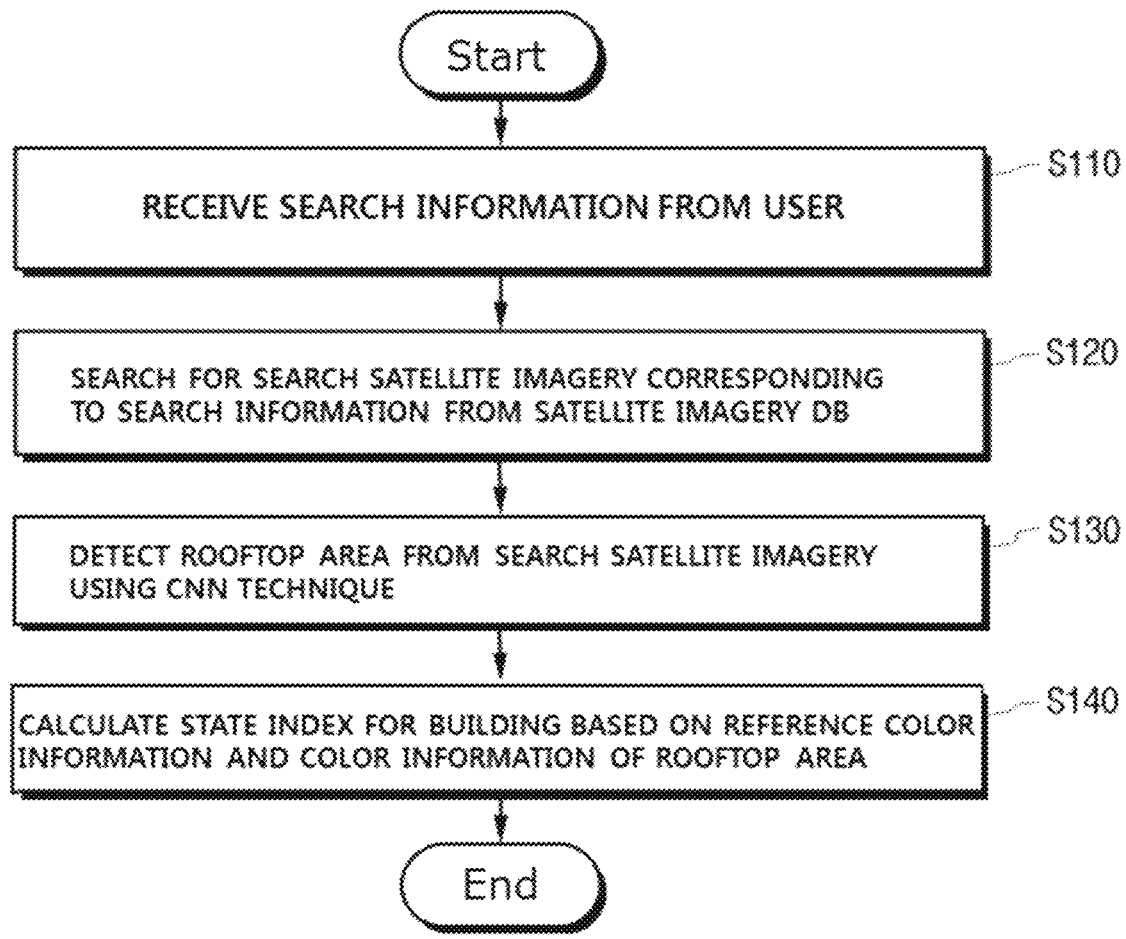

[FIG. 2]
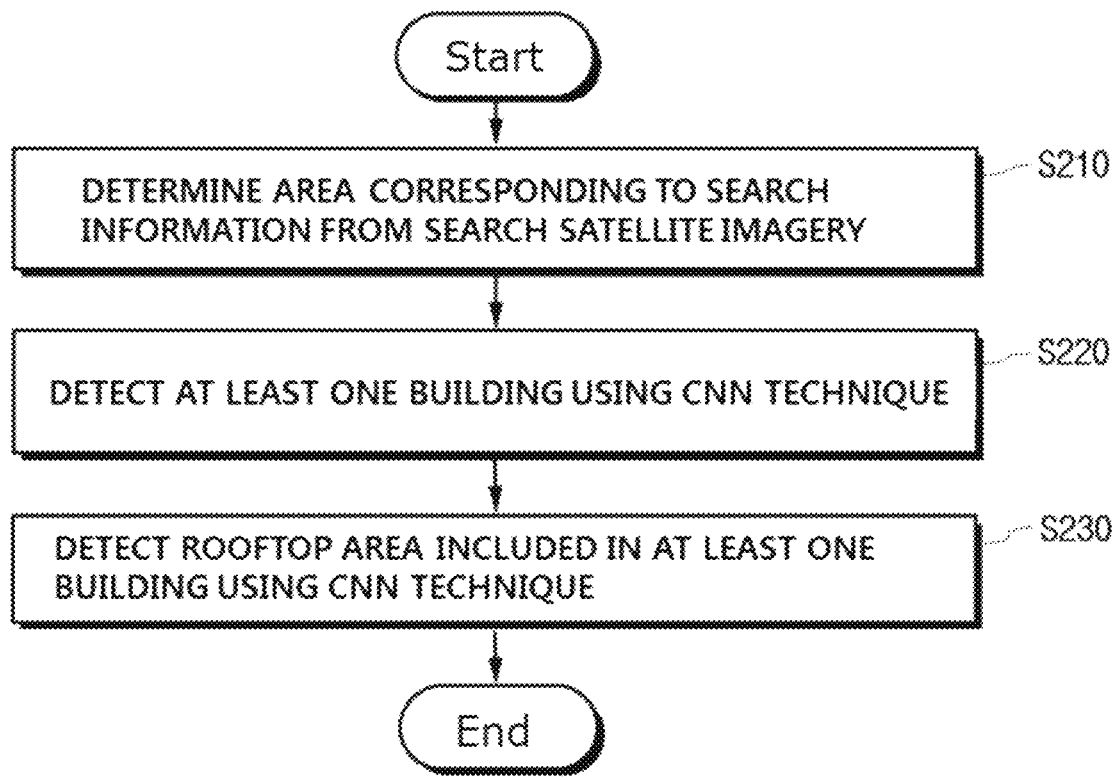
[FIG. 3]
300
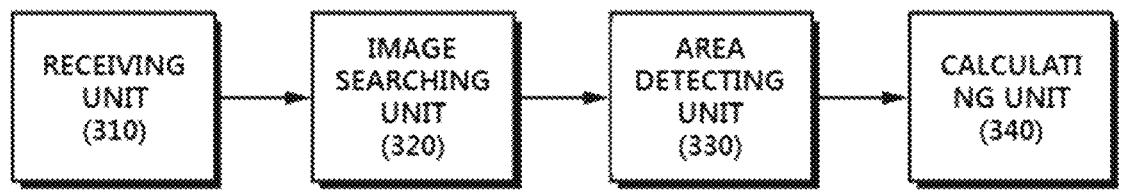

[FIG. 4]
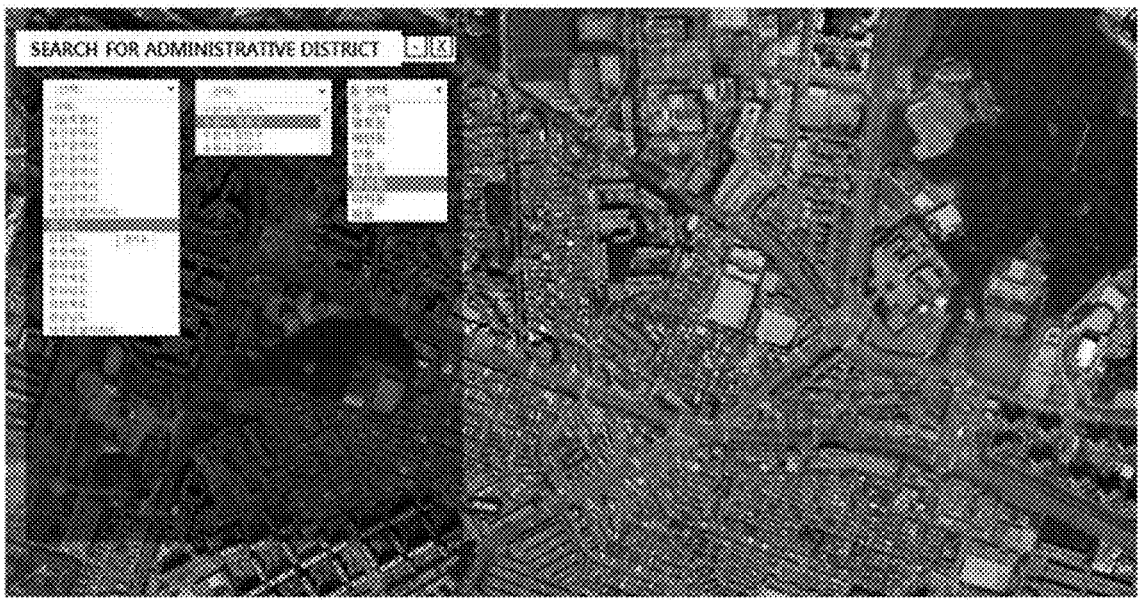
[FIG. 5]
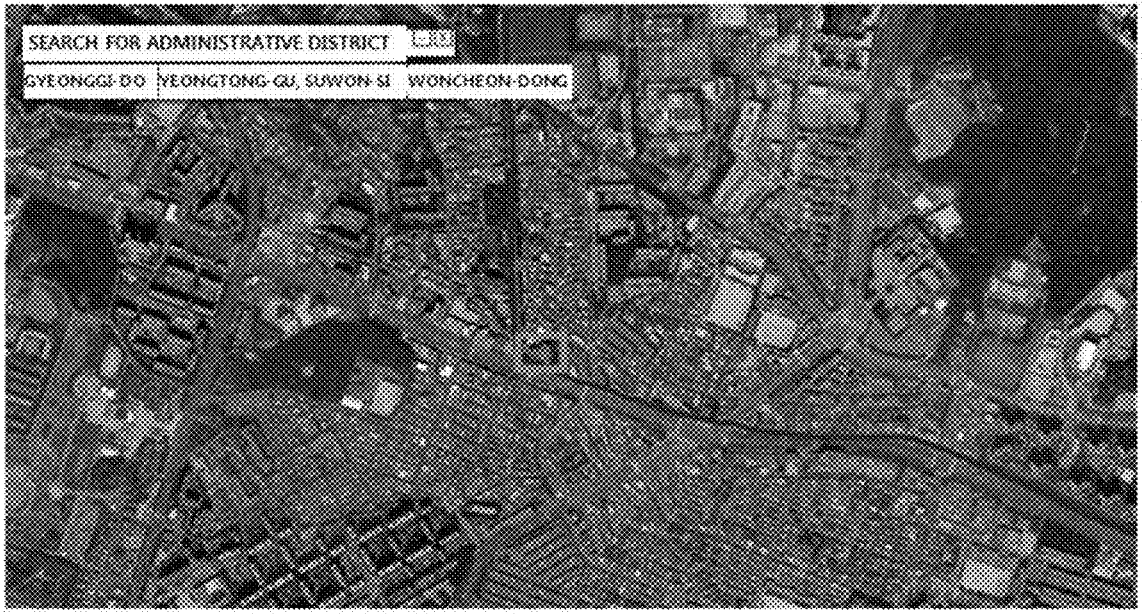

[FIG. 6]
[FIG. 7]
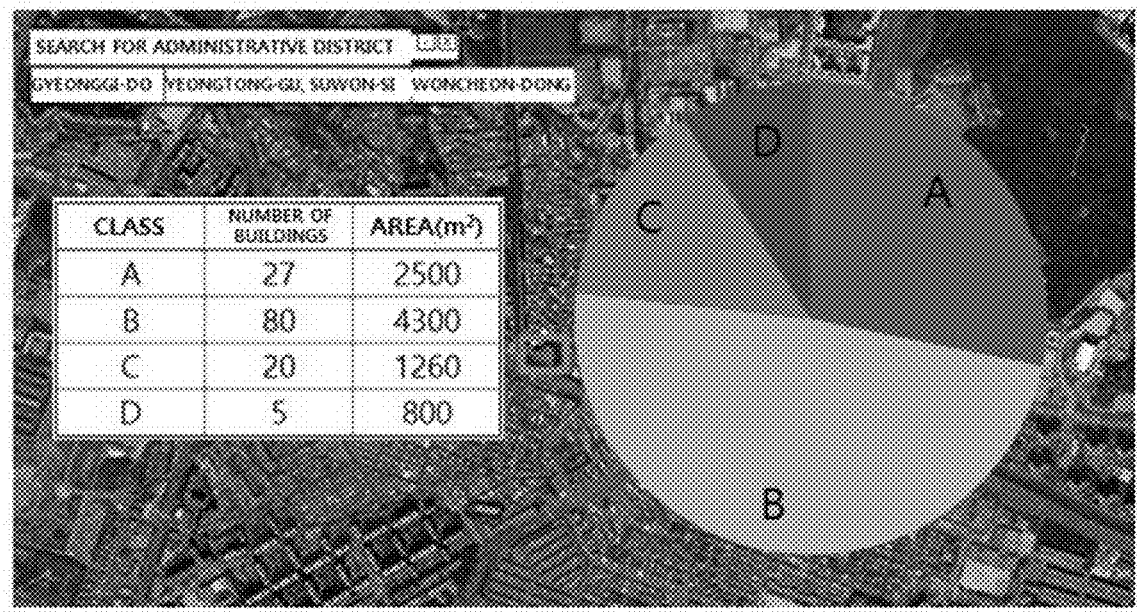

METHOD AND APPARATUS FOR ESTIMATING STATE OF WATERPROOF PAINT OF BUILDINGS USING SATELLITE IMAGERY

CROSS-REFERENCE TO RELATED APPLICATIONS

This application claims the priority of Korean Patent Application No. 10-2021-0012693 filed on Jan. 28, 2021, in the Korean Intellectual Property Office, the disclosure of which is incorporated herein by reference.

BACKGROUND

Field

The present disclosure relates to a method and an apparatus for estimating an applied state of a waterproof paint of buildings using a satellite imagery.

Description of the Related Art

When a city is observed with aerial photographs, rooftops of most buildings are covered with waterproof paints so that it is difficult to find buildings which are not covered with waterproof paints. The waterproofing of rooftop directly affects the lifecycle of the building so that it is important for building management to periodically apply the paint by appropriately considering a reapplication timing. However, it is possible to see parts in which paint has been peeled off and removed, from many buildings, because the waterproof paint is not reapplied.

The application of the waterproof paint is carried out by the individuals or owners of the buildings at regular intervals. However, the waterproof paint which is being used for the waterproofing task in most buildings is urethane waterproof paint with a green color. The green waterproof paint has a high heat absorption rate so that it is disadvantageous in that it lowers a cooling efficiency in summer by increasing a temperature inside the building.

Accordingly, with regard to cool roof campaign which is attracting attention in recent years, the necessity for a method and an apparatus for determining an applied state of the waterproof paint of buildings to improve the rooftop aesthetic of buildings as well as energy saving is emerging.

SUMMARY

An object of the present disclosure is to provide a method and an apparatus for determining an applied state of a waterproof paint of buildings using a satellite imagery.

In order to achieve the above-described objects, according to an aspect of the present disclosure, a waterproof paint state determining method of a building using a satellite imagery includes receiving search information including information about a location in which a waterproof paint application state of a rooftop of a building is to be measured from a user; searching a search satellite imagery which is at least one satellite imagery corresponding to the search information, from a satellite imagery DB including a plurality of satellite imagery data; detecting a rooftop area which is a waterproof paint application area of at least one building corresponding to the search information from the search satellite imagery, using a convolutional neural network (CNN) technique; and calculating a state index which is an index indicating a waterproof paint application state of at least one building, based on reference color information and color information of the rooftop area.

Desirably, the search information may include information about an address, a street name, an administrative district name, or a longitude and latitude coordinate corresponding to a location in which an applied state of the waterproof paint is to be measured.

Desirably, the detecting of a rooftop area which is a waterproof paint application area includes: determining an area corresponding to the search information from the search satellite imagery; detecting at least one building included in the area corresponding to the search information using a CNN technique; and detecting the rooftop area included in at least one detected building using the CNN technique.

Desirably, in the calculating of a state index which is an index indicating the applied state, the state index may be calculated using a color consistency index which is information about a ratio of a dominant color in the rooftop area and a color variation index which is information indicating a difference between the color of the rooftop area and a color of the reference color information.

Desirably, in the calculating of a state index which is an index indicating the applied state, the state index may be calculated using Equation 1.

$$\text{State index} = x \cdot D + y \cdot P \qquad \text{[Equation 1]}$$

in which x is a weight, D is a color variation index, y is a weight, and P is a color consistency index.

In order to achieve the above-described objects, according to another aspect of the present disclosure, a waterproof paint state determining apparatus of a building using a satellite imagery includes a receiving unit which receives search information including information about a location in which a waterproof paint application state of a rooftop of a building is to be measured from a user; an image searching unit which searches a search satellite imagery which is at least one satellite imagery corresponding to the search information from a satellite imagery DB including a plurality of satellite imagery data; an area detecting unit which detects a rooftop area which is a waterproof paint application area of at least one building corresponding to the search information from the search satellite imagery, using a convolutional neural network (CNN) technique; and a calculating unit which calculates a state index which is an index indicating a waterproof paint application state of at least one building, based on reference color information and color information of the rooftop area.

Desirably, the search information may include information about an address, a street name, an administrative district name, or a longitude and latitude coordinate corresponding to a location in which an applied state of the waterproof paint is to be measured.

Desirably, the area detecting unit determines an area corresponding to the search information from the search satellite imagery, detects at least one building included in the area corresponding to the search information using a CNN technique, and may detect the rooftop area included in at least one detected building using the CNN technique.

Desirably, the calculating unit may calculate the state index using a color consistency index which is information about a ratio of a dominant color in the rooftop area and a color variation index which is information indicating a difference between the color of the rooftop area and a color of the reference color information.

Desirably, the calculating unit may calculate the state index using Equation 2.

$$\text{State index} = x \cdot D + y \cdot P \qquad \text{[Equation 2]}$$

in which x is a weight, D is a color variation index, y is a weight, and P is a color consistency index.

According to an exemplary embodiment disclosed in the present disclosure, the task of checking an applied state of the waterproof paint which had to be checked by directly visiting the site in the related art may be extensively analyzed in the unit of regions without visiting the site in person.

Further, according to the exemplary embodiment disclosed in the present disclosure, when the water permeation occurs on the rooftops or outer walls of the buildings, it not only directly affects the lifecycle of the buildings, but also causes mold on the inner wall, which leads to the lowering of the quality of life of residents. Accordingly, the waterproofing task of the rooftop which is directly exposed to the external environment is essential, so that buildings in need of waterproofing are detected in advance by real-time extensive monitoring by utilizing satellite data, thereby preventing the above-mentioned problems.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a flowchart for explaining a method for determining a state of a waterproof paint of buildings using a satellite imagery according to an exemplary embodiment of the present disclosure;

FIG. 2 is a flowchart for explaining a rooftop area detecting method according to an exemplary embodiment of the present disclosure;

FIG. 3 is a block diagram for explaining an apparatus for determining a state of a waterproof paint of buildings using a satellite imagery according to an exemplary embodiment of the present disclosure;

FIG. 4 is a view for explaining a search information input screen according to an exemplary embodiment of the present disclosure;

FIGS. 5 and 6 are views for explaining building detecting and state index calculating result according to an exemplary embodiment of the present disclosure; and FIG. 7 is a view for explaining a state index calculating result in the unit of administrative districts according to an exemplary embodiment of the present disclosure.

DETAILED DESCRIPTION OF THE PREFERRED EMBODIMENT

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present disclosure. A singular form may include a plural form if there is no clearly opposite meaning in the context. In the present application, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

FIG. 1 is a flowchart for explaining a method for determining a state of a waterproof paint of buildings using a satellite imagery according to an exemplary embodiment of the present disclosure.

In step S110, the state determining apparatus receives search information including information about a location in which an applied state of a waterproof paint of a rooftop of a building is to be measured from a user.

For example, the user may generate search information including information about a location in which an applied state of the waterproof paint is to be measured, using an application of a smart phone or an application or a web browser of a PC. To be more specific, referring to FIG. 4, it may be confirmed that the user generates search information about a specific administrative district (for example, Woncheon-dong, Yeongtong-gu, Suwon-si, Gyeonggi-do).

Further, the state determining apparatus may receive the generated search information from the smart phone or the PC of the user through a wired or wireless network.

According to another exemplary embodiment, the search information may include information about an address, a street name, an administrative district name, or a longitude and latitude coordinate corresponding to a location in which an applied state of the waterproof paint is to be measured.

That is, the search information may include information about a specific address, a specific street name, a specific administrative district name, or specific longitude and latitude coordinate(s) that the user wants to search for. In other words, the search information may be generated by various user interfaces which are capable of inputting addresses, street names, administrative district names, and longitude and latitude coordinates in consideration of the convenience of the user. Further, the administrative district name may be names of various administrative district units such as city/county, city/county/district, eup/myeon/dong, or administrative dong/legal dong.

In step S120, the state determining apparatus searches for a search satellite imagery which is at least one satellite imagery corresponding to the search information, from a satellite imagery DB including a plurality of satellite imagery data.

At this time, the state determining apparatus may be directly connected to the satellite imagery DB, or may also be wirelessly connected thereto through a network. Further, the satellite imagery DB consistently collects satellites image data whenever the satellite image data is updated and deletes old data to always include recent satellite imagery data.

In the meantime, the state determining apparatus may search for a search satellite imagery which is at least one satellite imagery including a location or an area included in the search information from the satellite imagery DB. That is, the state determining apparatus searches for at least one satellite imagery including a location or an area included in the search information, by considering that the satellite image has a predetermined size according to a specification of a satellite.

For example, the state determining apparatus uses a polygonal longitude and latitude coordinate corresponding to the administrative district of "Woncheon-dong, Yeongtong-gu, Suwon-si, Gyeonggi-do" to detect a plurality of satellite imageries having a region overlapping the polygon from the satellite imagery DB as a search satellite imagery. At this time, each satellite imagery stored in the satellite imagery DB may also include information about the longitude and altitude coordinate indicating a location of the corresponding imagery.

In step S130, the state determining apparatus detects a rooftop area which is a waterproof paint application area of at least one building corresponding to the search information from the search satellite imagery, using a convolutional neural network (CNN) technique.

Here, the CNN which is a convolution neural network is one type of deep neural networks (DNN) and represents a neural network configured by one or a plurality of convolutional layers, pooling layers, and fully connected layers. The CNN has a structure appropriate for the learning of two-dimensional data and may be trained by a backpropagation algorithm. The CNN is one of representative models of the DNN which are widely utilized in various application fields such as object classification in the image or object detection.

That is, the state determining apparatus applies a CNN technique to detect at least one building corresponding to search information from the search satellite imagery and may detect a rooftop area which is an area in which waterproof paint is applied, from at least one detected building. At this time, the state determining apparatus may use a CNN model trained to detect a building from the imagery and a CNN model trained to detect a rooftop area from the detected building.

Details thereof will be described below with reference to FIG. 2.

Finally, in step S140, the state determining apparatus calculates a state index which is an index indicating an applied state of the waterproof paint for at least one building, based on reference color information and color information of the rooftop area.

That is, the state determining apparatus may calculate a state index which is an index indicating an applied state of the waterproof paint of the individual building using reference color information and color information about at least one building of the rooftop area.

For example, the state determining apparatus may calculate a state index by comparing colors of at least one building, using a color represented in the satellite imagery of the rooftop area of a building on which a green urethane waterproof paint is applied in a predetermined period, as reference color information.

At this time, the state index corresponding to the calculated specific search information may be designed to be stored in a statistical DB to be immediately called.

In the meantime, the reference color information also includes at least one color information about at least one type of waterproof paint.

According to another exemplary embodiment, the state determining apparatus may calculate a state index using a color consistency index which is information about a ratio of a dominant color which occupies the rooftop area and a color variation index which is information indicating a difference between a color of the rooftop area and a color of the reference color information.

At this time, the color consistency index may be a value obtained by converting a ratio of the dominant color which is the most included color, among all colors included in the rooftop area of the satellite imagery, into a score. It considers that the more recently applied waterproof paint, the higher the ratio of the dominant color.

Further, the color variation index is an index obtained by representing the difference between the color of the reference color information and the color of the rooftop area as numerical values. For example, in an RGB color system, a color coordinate distance of RGB may be used for the calculation.

According to still another exemplary embodiment, the state determining apparatus may calculate a state index using Equation 1.

$$\text{State index} = x \cdot D + y \cdot P \qquad \text{[Equation 1]}$$

Here, x is a weight, D is a color variation index, y is a weight, and P is a color consistency index.

That is, the state determining apparatus may calculate a state index by applying weights x and y to the color variation index D and the color consistency index P. At this time, weights x and y may be variably determined in accordance with various situations.

Moreover, the state determining apparatus may classify each building such that when a calculated state index is 80 to 100, the building is classified as a class A that does not need to replace or review to replace, when a state index is 60 to 79, the building is classified as a class B that needs to visit to check and establish waterproof schedule within one year, when a state index is 40 to 59, the building is classified as a class C that is expected to have insufficient waterproofing effect and requires waterproofing reconstruction within one year, and when a state index is 0 to 39, the building is classified a class D that does not perform the waterproofing construction or requires reconstruction. At this time, the color consistency index is calculated as a value of 0 to 10, the color variation index is calculated as a value of 0 to 5, and x and y are set to an appropriate value such that a highest value of the state index is 100.

In the meantime, referring to FIG. 7, the state determining apparatus generates statistical data about a state index of a building located in a specific administrative district and stores the statistical data in a statistical DB and may provide related data upon the request of the user.

FIG. 2 is a flowchart for explaining a rooftop area detecting method according to an embodiment of the present disclosure.

In step S210, the state determining apparatus determines an area corresponding to search information in a search satellite imagery.

For example, when the search information includes information of the administrative district name, the state determining apparatus configures a longitude and latitude coordinate of a polygonal area corresponding to the administrative district. The state determining apparatus may determines an area included in the longitude and latitude coordinate of the polygonal area in the search satellite imagery.

In step S220, the state determining apparatus detects at least one building included in the area corresponding to the search information using the CNN technique.

That is, the state determining apparatus may detect at least one building from an area included in the longitude and latitude coordinate of the polygonal area from the search satellite imagery, using the CNN model trained to detect a building from the imagery. For example, referring to FIG. 5, the state determining apparatus may confirm a result of detecting a building in a specific administrative district.

Finally, in step S230, the state determining apparatus detects a rooftop area included in at least one detected building using the CNN technique.

That is, the state determining apparatus may detect the rooftop area from at least one detected building using the CNN model trained to detect a rooftop area representing a color similar to a rooftop paint color.

To be more specific, referring to FIG. 6, the state determining apparatus may detect a rooftop area using the CNN model from at least one detected building.

FIG. 3 is a block diagram for explaining an apparatus for determining a state of a waterproof paint of buildings using a satellite imagery according to an exemplary embodiment of the present disclosure.

Referring to FIG. 3, a waterproof paint state determining apparatus 300 of a building using a satellite imagery according to an exemplary embodiment of the present disclosure includes a receiving unit 310, an image searching unit 320, an area detecting unit 330, and a calculating unit 340.

The receiving unit 310 receives search information including information about a location in which the waterproof paint application state of the rooftop of a building is to be measured from the user.

According to another exemplary embodiment, the search information may include information about an address, a street name, an administrative district name, or a longitude and latitude coordinate corresponding to a location in which an applied state of the waterproof paint is to be measured.

The imagery searching unit 320 searches for a search satellite imagery which is at least one satellite imagery corresponding to the search information, from a satellite imagery DB including a plurality of satellite imagery data.

The area detecting unit 330 detects a rooftop area which is a waterproof paint application area of at least one building corresponding to the search information from the search satellite imagery, using a convolutional neural network (CNN) technique.

According to another exemplary embodiment, the area detecting unit 330 determines an area corresponding to search information in the search satellite imagery, detects at least one building included in the area corresponding to the search information using a CNN technique, and may detect the rooftop area included in at least one detected building using the CNN technique.

Finally, the calculating unit 340 calculates a state index which is an index indicating an applied state of the waterproof paint for at least one building, based on reference color information and color information of the rooftop area.

According to another exemplary embodiment, the calculating unit 340 may calculate a state index using a color consistency index which is information about a ratio of a dominant color which occupies the rooftop area and a color variation index which is information indicating a difference between a color of the rooftop area and a color of the reference color information.

According to another exemplary embodiment, the calculating unit 340 may calculate a state index using Equation 2.

$$\text{State index} = x \cdot D + y \cdot P \qquad \text{[Equation 2]}$$

Here, x is a weight, D is a color variation index, y is a weight, and P is a color consistency index.

It will be appreciated that various exemplary embodiments of the present disclosure have been described herein for purposes of illustration, and that various modifications, changes, and substitutions may be made by those skilled in the art without departing from the scope and spirit of the present disclosure. Accordingly, the exemplary embodiments disclosed herein are intended to not limit but describe the technical spirit of the present disclosure and the scope of the technical spirit of the present disclosure is not restricted by the exemplary embodiments. The protective scope of the present disclosure should be construed based on the following claims, and all the technical concepts in the equivalent scope thereof should be construed as falling within the scope of the present disclosure.

What is claimed is:

1. A waterproof paint state determining method of a building using a satellite imagery, comprising:

receiving search information including information about a location in which a waterproof paint application state of a rooftop of a building is to be measured from a user;

searching a search satellite imagery which is at least one satellite imagery corresponding to the search information, from a satellite imagery DB including a plurality of satellite imagery data;

detecting a rooftop area which is a waterproof paint application area of at least one building corresponding to the search information from the search satellite imagery, using a convolutional neural network (CNN) technique; and calculating a state index which is an index indicating a waterproof paint application state of at least one building, based on reference color information and color information of the rooftop area, wherein in the calculating of a state index which is an index indicating the applied state, the state index is calculated using a color consistency index which is information about a ratio of a dominant color in the rooftop area and a color variation index which is information indicating a difference between the color of the rooftop area and a color of the reference color information.

2. The waterproof paint state determining method according to claim 1, wherein the search information includes information about an address, a street name, an administrative district name, or a longitude and latitude coordinate corresponding to a location in which an applied state of the waterproof paint is to be measured.

3. The waterproof paint state determining method according to claim 1, wherein the detecting of a rooftop area which is a waterproof paint application area includes:

determining an area corresponding to the search information from the search satellite imagery;

detecting at least one building included in the area corresponding to the search information using a CNN technique; and detecting the rooftop area included in at least one detected building using the CNN technique.

4. The waterproof paint state determining method according to claim 1, wherein in the calculating of a state index which is an index indicating the applied state, the state index is calculated using Equation 1, $$\text{State index} = x \cdot D + y \cdot P \quad \text{[Equation 1]}$$

in which x is a weight, D is a color variation index, y is a weight, and P is a color consistency index.

5. A waterproof paint state determining apparatus of a building using a satellite imagery, comprising:
- a receiving unit which receives search information including information about a location in which a waterproof paint application state of a rooftop of a building is to be measured from a user;
- an image searching unit which searches a search satellite imagery which is at least one satellite imagery corresponding to the search information from a satellite imagery DB including a plurality of satellite imagery data;
- an area detecting unit which detects a rooftop area which is a waterproof paint application area of at least one building corresponding to the search information from the search satellite imagery, using a convolutional neural network (CNN) technique; and
- a calculating unit which calculates a state index which is an index indicating a waterproof paint application state of at least one building, based on reference color information and color information of the rooftop area, wherein the calculating unit calculates the state index using a color consistency index which is information about a ratio of a dominant color in the rooftop area and a color variation index which is information indicating a difference between the color of the rooftop area and a color of the reference color information.

6. The waterproof paint state determining apparatus according to claim 5, wherein the search information includes information about an address, a street name, an administrative district name, or a longitude and latitude coordinate corresponding to a location in which an applied state of the waterproof paint is to be measured.

7. The waterproof paint state determining apparatus according to claim 5, wherein the area detecting unit determines an area corresponding to the search information from the search satellite imagery, detects at least one building included in the area corresponding to the search information using a CNN technique, and detects the rooftop area included in at least one detected building using the CNN technique.

8. The waterproof paint state determining apparatus according to claim 5, wherein the calculating unit calculates the state index using Equation 2, $$\text{State index} = x \cdot D + y \cdot P \quad \text{[Equation 2]}$$

in which x is a weight, D is a color variation index, y is a weight, and P is a color consistency index.

\* \* \* \* \*